(12) United States Patent
Jeyachandran et al.

(10) Patent No.: US 9,014,012 B2
(45) Date of Patent: Apr. 21, 2015

(54) NETWORK PATH DISCOVERY AND ANALYSIS

(75) Inventors: Vinod Jeyachandran, Rockville, MD (US); Pradeep Natarajan, Raleigh, NC (US); James Mark Shaw, Cary, NC (US); Raghavendra Uppalli, Cary, NC (US); Pradeep Singh, McLean, VA (US); Nitin Gupta, Rockville, MD (US); Jerrold Stiffler, Cary, NC (US)

(73) Assignee: Riverbed Technology, Inc., San Francisco, CA (US)

( * ) Notice: Subject to any disclaimer, the term of this patent is extended or adjusted under 35 U.S.C. 154(b) by 364 days.

(21) Appl. No.: 12/900,357

(22) Filed: Oct. 7, 2010

(65) Prior Publication Data

US 2011/0085450 A1    Apr. 14, 2011

Related U.S. Application Data

(60) Provisional application No. 61/249,287, filed on Oct. 7, 2009, provisional application No. 61/374,064, filed on Aug. 16, 2010.

(51) Int. Cl.
*H04L 1/00* (2006.01)
*H04L 12/24* (2006.01)

(52) U.S. Cl.
CPC ............. *H04L 41/12* (2013.01); *H04L 41/0213* (2013.01)

(58) Field of Classification Search
USPC ................. 370/241–259, 351, 352, 216, 503; 709/224
See application file for complete search history.

(56) References Cited

U.S. PATENT DOCUMENTS

| | | | |
|---|---|---|---|
| 7,293,106 B2 | 11/2007 | Natajaran et al. | |
| 7,742,426 B2 | 6/2010 | Schumacher et al. | |
| 7,760,735 B1 | 7/2010 | Chen et al. | |
| 2007/0019559 A1* | 1/2007 | Pittelli et al. | 370/248 |
| 2008/0232262 A1* | 9/2008 | Beygelzimer et al. | 370/252 |
| 2009/0222555 A1* | 9/2009 | Qian et al. | 709/224 |
| 2010/0014424 A1* | 1/2010 | Agrawal et al. | 370/235 |
| 2010/0074118 A1* | 3/2010 | Gale et al. | 370/242 |

* cited by examiner

*Primary Examiner* — Andrew Lai
*Assistant Examiner* — Jamaal Henson
(74) *Attorney, Agent, or Firm* — Park, Vaughan, Fleming & Dowler LLP

(57) ABSTRACT

A network analysis system invokes an application specific, or source-destination specific, path discovery process. The application specific path discovery process determines the path(s) used by the application, collects performance data from the nodes along the path, and communicates this performance data to the network analysis system for subsequent performance analysis. The system may also maintain a database of prior network configurations to facilitate the identification of nodes that are off the path that may affect the current performance of the application. The system may also be specifically controlled so as to identify the path between any pair of specified nodes, and to optionally collect performance data associated with the path.

38 Claims, 4 Drawing Sheets

NETWORK PATH DISCOVERY AND ANALYSIS

This application claims the benefit of U.S. Provisional Patent Applications 61/249,287, filed 7 Oct. 2009, and 61/374,064, filed 16 Aug. 2010.

BACKGROUND AND SUMMARY OF THE INVENTION

This invention relates to the field of network analysis, and in particular to a system and method that facilitate the discovery of nodes along the path of a network application, or between any two identified nodes, and the subsequent collection and analysis of performance parameters associated with these nodes and related nodes.

The ever increasing use of applications that communicate across a network has led to changes in the conventional 'network management' role. A network manager is generally concerned with the overall health/performance of the network. However, each user of an application is affected by the performance of the particular application on a network, and is relatively uninterested in overall performance measures when the particular application exhibits poor performance on the overall-healthy network. Accordingly, the network manager must be sensitive to application-specific performance problems.

If a user of the application reports a problem, such as long delay times, a network manager generally needs to analyze the performance of the application server node as well as each node in the network along the path between the user and the application server. In like manner, determining the path between two identified nodes will also facilitate preventive maintenance tasks, security analysis, planning tasks, or any other task that requires path identification.

Identifying the nodes along a path is typically a two-step process. Using the OSI network model, a path can be defined by the network layer nodes, or layer-3 nodes, and a more detailed path can be defined by the data-link layer devices, or layer-2 devices. Network layer nodes generally provide dynamic switching, based for example on the current contents of a routing table at the network layer node. Typically, the network layer path between the two nodes is found, then the data link layer devices that lie along the determined path are identified.

There are two common techniques used to determine the network layer path between a source node and a destination node, an 'active' technique that includes sending trace messages from the source node to the destination, and a 'passive' technique that includes sequentially investigating the configuration of the routers to determine the 'next hop' toward the destination.

U.S. Pat. No. 7,742,426, "SYSTEM, METHOD, AND COMPUTER-READABLE MEDIUM FOR DETERMINING A LAYER-2 TRACE IN A HETEROGENEOUS NETWORK SYSTEM", issued 22 Jun. 2010 to Schumacher et al., discloses using a trace request to identify the network layer path between a pair of nodes, then finding the layer-2 devices along each of the identified links forming the path, and is incorporated by reference herein.

U.S. Pat. No. 7,293,106, "METHOD OF FINDING A PATH BETWEEN TWO NODES IN A NETWORK", issued 6 Nov. 2007 to Natarajan et al. and incorporated by reference herein, discloses sequentially identifying each next hop based on routing tables, and identifying the data link layer devices along the hop based on a network topology database.

U.S. Pat. No. 7,760,735, "METHOD AND SYSTEM FOR DISCOVERING NETWORK PATHS", issued 20 Jul. 2010 to Chen et al. and incorporated by reference herein, discloses querying network devices for their current configuration, including routing tables, and sequentially proceeding along the path identified by the next-hop information, using interface definitions at each device to identify the data link layer devices along the path.

While these prior art systems are effective for finding devices along a path between two nodes, they each rely on having access to certain features or capabilities that may or may not be available to a particular network manager. For example, Schumacher relies on having access to the source node in order to send the trace request to the destination node. Often, the network is provided by a third-party provider, and the user at the source node may be reluctant to allow this third-party to access the node. In like manner, Natarajan relies on the fact that the data link layer topology of the network is known. In many cases, the path between two nodes may extend across 'foreign' networks, such as public networks, for which topological information is not available. Similarly, Chen relies on being able to query each device along the path of next-hops, presuming that all of the network devices are freely accessible. If a device cannot be queried directly for the next hop, but responds to SNMP requests, the entire routing table would need to be downloaded and processed to determine the next hop. In a large, complex network, the routing tables can be quite large, and it may not be feasible to download all of the routing tables for devices that cannot be queried directly for the next hop.

The analysis of an application specific problem is often compounded if the cause of the problem is a node that is not in the application path but impacts a node that is in the path. For example, most networks are fault-tolerant, such that when a node on a path fails, the path is automatically altered to avoid the failed node. If the alternative path inherently has poorer performance than the original path, the user will typically report a degradation in the application's performance. However, an assessment of the nodes along this new path will not identify the problem, because each node on the new path will be working properly.

It would be advantageous to integrate the variety of techniques used in the path discovery process. It would also be advantageous to automate the use of alternative techniques during the path discovery process. It would also be advantageous to identify nodes that are not on the path that may be impacting the nodes on the path.

These advantages, and others, may be realized by a network analysis system that automatically invokes different path discovery techniques, based on the conditions found as the path discovery process proceeds. The path discovery process determines the path(s) used by the application, collects performance data from the nodes along the path, and communicates this performance data to the problem reporting system for subsequent performance analysis. The system may also maintain a database of prior network configurations to facilitate the identification of nodes that are off the path that may affect the current performance of the application.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1:
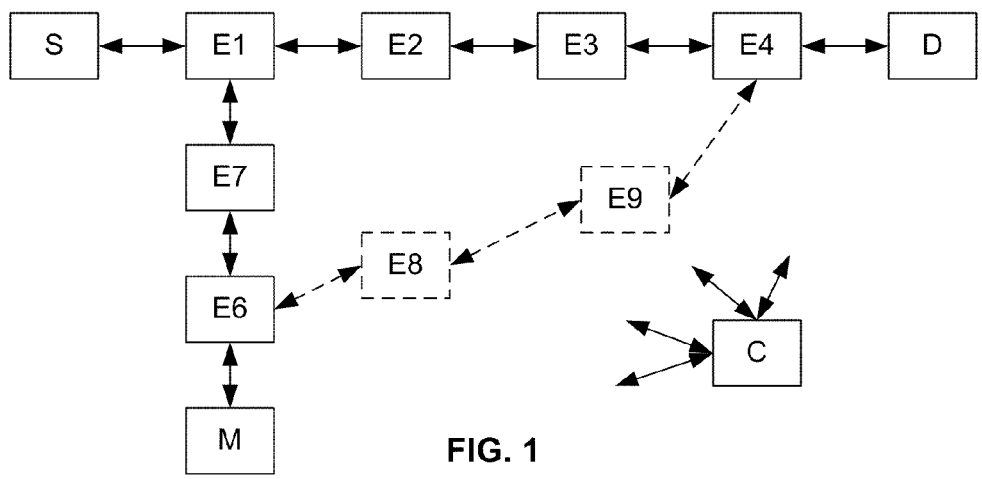
FIG. 1 illustrates an example network of elements on a path between a source and destination node, and an example monitoring system for determining the path and collecting data associated with the elements on the path.

FIG. 1 illustrates an example subset of a network, the subset comprising a source node S, destination node D, monitoring node M, elements E1-E4 along a path between the source S and destination D nodes, elements E6-E7 between the monitoring node M and element E1, and elements E8-E9 between the elements E6 and E4. The network is assumed to have other elements coupled to the illustrated nodes and elements, and the illustrated paths will not be immediately apparent among the links coupling all of these other elements. The terms 'node' and 'element' are used herein to facilitate a distinction between "end-nodes" (or "nodes of interest") and "intermediate nodes" (or "data-passing" nodes), although the terms are synonymous in the art and in the context of this disclosure. That is each 'element' will generally be a node of a network, and each 'node' may be an element in a path between a different set of source and destination nodes.

The example elements E1-E9 will generally be routing elements that are dynamically configured to establish the paths for communications between the nodes. This dynamic configuration may include configurations that are manually defined by a network administrator, automatically defined based on metrics associated with the available links between nodes, or a combination of these and/or any other routing technique common in the art. In standard OSI terminology, these elements E1-E9 are typically elements at the network layer, or layer-3 elements. Other devices will generally exist between these network layer elements, at the data-link layer (layer-2), but these devices will generally have static configurations that do not directly affect the routing of a message between nodes.

Also illustrated in FIG. 1 is a controller C that controls the monitor node M in response to alerts or other events associated with the network. In a typical scenario, the controller C will be alerted to a potential problem associated with communications between a given set of source S and destination D nodes. As noted above, this alert may be in the form of a user complaint that a particular application that communicates between the source and destination is experiencing a performance degradation. Alternatively, the alert may be automatically generated by an application when communications between a source-destination pair drop below some performance threshold. One of skill in the art will recognize that other techniques of alerting a controller may be used, the source of the alert being immaterial to the principles of this invention.

Upon receipt of an alert that a given source-destination pair may be experiencing problems, or any other request for information regarding communications between the source-destination pair, the controller directs the monitor node M to determine the current path between these nodes. The technique(s) used to determine the current path between the source S and destination D will generally depend upon the level of communication control that the monitor node M can achieve with the given nodes and the elements between them.

Figure 2:
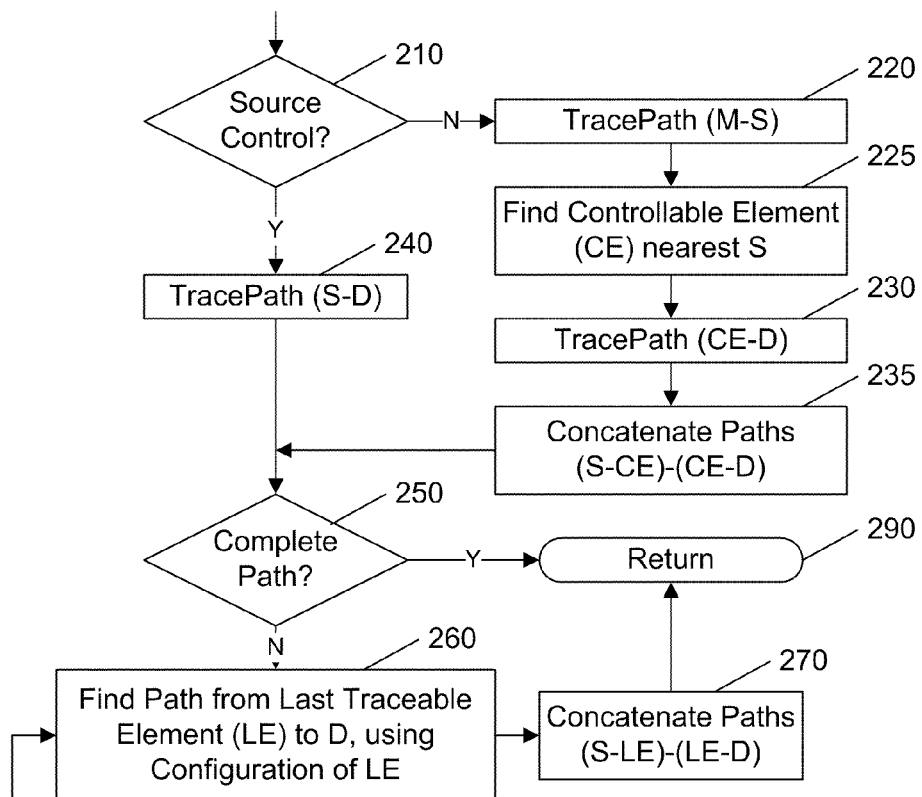
FIG. 2 illustrates an example flow diagram for finding the path between a source and destination node.

FIG. 2 illustrates an example flow diagram for determining the path between a source node S and a destination node D, depending upon the level of communication control achievable by the monitor node M.

At 210, the monitor node M may attempt to control the source node to initiate a communication with the destination node. In an example embodiment, the controller C may send access information to the monitor node M that allows the monitor node M to remotely access the source node S to initiate this communication with D. This access information may have been stored in a database associated with the controller C, or it may have been provided in the alert that was communicated to the controller C.

If the monitor node M is able to initiate communications from the source node S, the monitor node M may send a "traceroute" or similar command to the destination node D, at 240. As noted above, utilities are often provided for generating traces as a message traverses a network. A 'traceroute' or 'tracepath' message, for example, is configured to cause each element that receives the message to respond to the sender, even if that element is not the intended recipient of the message. The response may be a notification of receiving the message, or a notification of forwarding the message, or combinations of such or similar notifications. In this manner, each element that passes the message to a next element along the path to the intended recipient (destination) notifies the sender that it received the message. The utility programs that cause these traceroute messages to be transmitted are configured to receive the responses, and to calculate one or more metrics associated with the transmission and reception, such as the duration of time between the transmission and reception.

For ease of reference and understanding, the term 'trace request' is used herein in the general sense meaning any communication utility that sends one or more messages that cause intermediate elements along the path of a network to send a notification that enables the utility to trace the path of the message(s). Also for ease of reference, unless otherwise noted, the 'path' discussed below is the network layer path (layer-3 path).

If, at 250, the trace request utility successfully identifies the path from the source S to the destination D, this path is returned, at 290. However, in some cases, the trace request utility will fail to determine the complete path to the destination D, and will report only a portion of the path from the source S toward the destination D.

In the event, at 250, that the complete path is not discovered by the trace request, the monitor node M may attempt to discover the remainder of the path by investigating the configuration of the last element that the trace request was able to identify, at 260. For example, with reference to FIG. 1, if the trace request identifies the portion of the path from source S to destination D as S-E1-E2-E3, and is unable to determine that element E4 is the next element along the path, the monitor node M may access a routing table at element E3 to determine that the 'next hop' for a message addressed to destination D will be element E4. Thereafter, the monitor node M may revert to sending a trace request from element E4 to determine that the destination D is within one hop of element E4, or the monitor node M may continue to determine the path by accessing the routing table, or other configuration information, at element E4. At 270, the trace request determined portion S-E1-E2-E3 is concatenated with the configuration determined path E3-E4-D, and the complete path S-E1-E2-E3-E4-D is returned, at 290.

If, at 210, the monitor node M is not able to initiate communications from the source node S, the monitor node M communicates a trace request to the source node S, at 220. Based on the trace request result (M-E6-E7-E1-S), the monitor node determines that element E1 is the closest identified element to the source node S. If communications from element E1 can be initiated by the monitor node M, the monitor node M initiates a trace request from element E1 to the destination node D. The resultant path from element E1 to destination node D is concatenated with the initially determined path from the controllable element E1 to the source node S, at 235.

If communications from element E1 are not controllable by the monitor node M, the trace request to destination D is initiated from the next-closest element (E7). In this case, the path from element E7 to destination D will likely include element E1, or the trace request can be configured to force the trace request to go through element E1. Knowing that element E1 is connected to the source node S, the concatenation of paths M-E6-E7-E1-S with the path E7-E1-E2-E3-E4-D, at 235 will result in the exclusion of the portion M-E6-E7 as being immaterial to the path S-E1-E2-E3-E4-D from the source node S to the destination node D.

As detailed above, if, at 250, the path determined at 235 is not a complete path to destination node D, the configuration of the last determined element along the path is assessed to determine the next element along the path to destination node D, at 260.

Optionally, the control element C may also direct the monitor node M to determine the path from the destination D to the source S, using the techniques detailed above with the roles of source and destination reversed. Alternatively, the control element may assume that the determined path is symmetric in direction, and messages from destination D to source S will travel along the same path.

Figure 3:
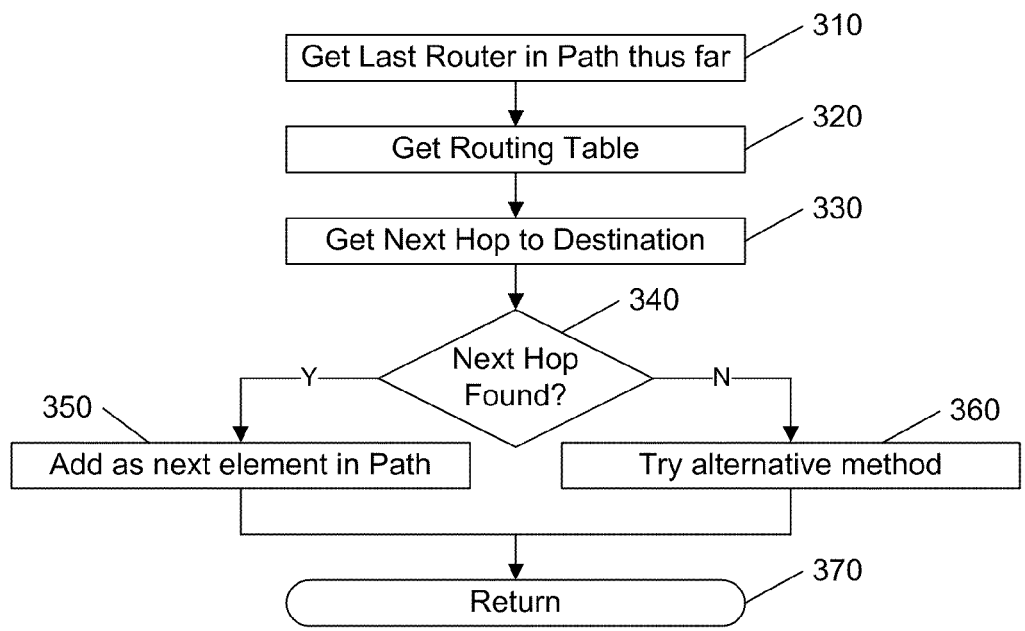
FIG. 3 illustrates an example flow diagram for an alternative technique for finding the path between a source and destination node.

FIG. 3 illustrates an example flow diagram for using configuration data to discover a next element along a truncated path determination, such as might be used in 260 of FIG. 2. For ease of reference and understanding, it is assumed that the last element determined by the trace request is a router, although it could be any of a variety of element types, typically OSI network layer elements.

At 310, the last element identified along the truncated path is identified, and its routing table is accessed at 320. This routing table may be the actual routing table on the router, or it may be a routing table stored within a model of the network, such as a simulation model. Based on the address of the destination node D, at 330, the routing table is assessed to determine where messages addressed to that address will be routed, typically identified as a 'next hop' element.

There are alternative techniques available for accessing the routing table, each having advantages and disadvantages. An SNMP request for the current routing table at a device will return the entire routing table, which can be stored for subsequent use. This table may then be searched to determine where messages addressed to the destination will be next sent. Alternatively, a device or vendor specific command can be sent to the router, such as "show ip route <dest>", requesting that the router specifically identify the next hop on the path to the identified destination (<dest>).

The direct request to the router may be the most efficient for specific requests, but different commands may be required for different devices, and secure access to the device is generally required. The SNMP request does not require a secure access, and stored tables can be quickly accessed, but the amount of data in an actively used router may be very large, and receiving and processing the data can be time and resource demanding. In an embodiment of this invention, the system is designed to selectively choose whether to perform a direct request or an SNMP request, based on the aforementioned consideration; for example, an SNMP request may be sent only if the device cannot be directly accessed, or if the size of the routing table is expected to be below a given threshold.

If, at 340, the next hop element has been found, that element is added as the next element along the determined path, at 350, and the path determined thus far is returned. As noted above, having determined the next element along the path, the process of FIG. 2 may merely continue to execute the flow of FIG. 3 until the complete path is found, or it may revert to use of the trace request to determine the path from this next element to the destination node D, including, as required, a return to the flow of FIG. 3 each time the trace request fails to identify a next element along the path.

If, at 340, the next hop element has not been found based on the contents of the routing table, or other configuration data, one or more alternative methods may be used to determine the missing elements along the path, at 360. For example, as noted above, the monitor node M can apply these path determination techniques to attempt to find a path from the destination node D to the source node S. If a next hop cannot be found along the path from the source S to the destination D, a reverse path from the destination D toward the source S may identify these missing elements, assuming a symmetry of paths to and from the source S and destination D. That is, for example, if the path from the source S to the destination D is truncated at element E3 (S-E1-E2-E3), the path from destination D to source S may reveal a partial path D-E4-E3, from which it can be assumed that messages at element E3 being sent to destination D will likely be sent from element E3 to element E4, and from element E4 to destination D.

Another alternative method, if the next hop element has not been found, at 340, is to generate "tracing traffic" along the currently determined path to the destination D. This tracing traffic includes one or more identifiers, either in the header information or the body content of the messages, that identify this traffic as tracing traffic. In such an embodiment, the network includes network collection nodes, such as 'sniffers', that monitor traffic flowing along the link(s) in the network, and the network analysis system is configured to identify which of these collection nodes monitored the presence of this tracing traffic. In this manner, if there are 'gaps' in the path determination, the system can at least determine the 'tail end' of the path as the tracing messages are detected along the path to the destination.

It is significant to note that the path determination need not include each and every device along the path. While the network analysis may be more thorough or complete with more detailed information, determining that the tracing traffic was transmitted from one node and 'eventually' arrived at a particular network collection node will often provide a sufficient level of detail with regard to the path, because any intermediate nodes between the transmitting node and the collection node will generally be beyond the control of the network manager who is unable to discover these intermediate nodes.

Figure 4:
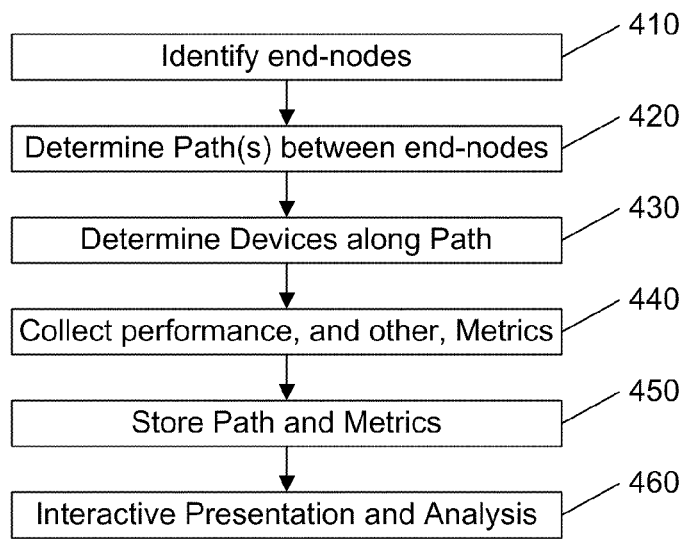
FIG. 4 illustrates an example flow diagram for collecting performance metrics associated with a path between a source and destination node.

FIG. 4 illustrates an example flow diagram for collecting performance metrics associated with a path between a source and destination node, as may be embodied on a controller C of FIG. 1. At 410, the controller identifies one or more pairs of end-nodes of interest, and at 420, the controller instructs the monitor to determine the path between these end-nodes, as detailed above.

The path determined by the monitor will generally identify the IP addresses of each of the network layer elements along the path. At 430, the devices corresponding to these addresses are identified, typically by the monitor. The monitor may attempt to map these IP addresses to network objects in its database and/or it may trigger automated discovery processes and metric polling for the IP address. The discovery process may access the configuration of the element identified by the address, and may generally provide more detailed information about the path, including, for example, identification of data link layer devices coupled to, or embodied with, the identified network layer element. Conventional neighbor discovery protocols, such as CDP (Cisco Discovery Protocol) and other link inference techniques may be used to determine the data link layer elements that provide the connectivity between the network layer elements. Optionally, the discovery process may also include identifying other network layer elements that are reachable at an equivalent 'cost' as the network layer elements in the identified path, and their performance metrics.

At 440, the controller instructs the monitor to collect performance and other metrics associated with each of the identified network objects. As is known in the art, most trace request utilities return one or more metrics, such as the response time, associated with each identified hop along the path; the monitor may also be configured to determine such metrics as interface utilization, interface errors, device CPU utilization, SLA data, and so on. Preferably, these metrics provide device level, hop level, and path/sub-path level information that can be used in any combination to understand the state of the network at any given time.

At 450, the current path, or paths, may be stored along with one or more of the metrics associated with each path, and at 460, the user is provided the opportunity to interact with the presentation of the determined path(s) and metrics, and perform subsequent analyses. Example analyses are detailed below.

Figure 5:
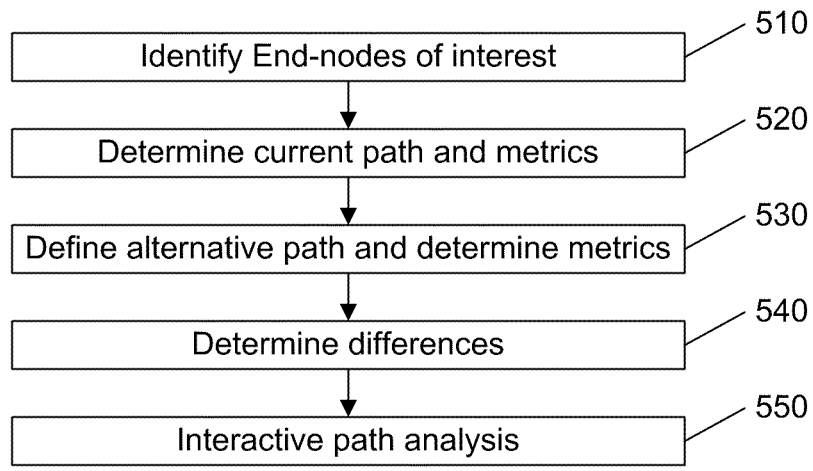
FIG. 5 illustrates an example flow diagram of the use of the monitoring system to identify anomalous performance.

FIG. 5 illustrates an example flow diagram for an analysis conducted to facilitate network planning and configuration, such as determining alternative paths for connecting the identified end-nodes (e.g. source and destination nodes).

At 510, the end-nodes are identified, and at 520, the current path and metrics associated with these nodes are determined, using the techniques detailed above. At 530, the user is provided the opportunity to define one or more alternative paths between these nodes. The alternative paths may be manually defined, or determined using an automated routing process, such as a determination of routes via simulations of a model of the network using differing routing criteria, or simulations of different models (e.g. actual and proposed network configurations).

At 540, the differences between the different paths and their performance metrics are identified. Thereafter, at 550, the user can view the alternatives, try different paths, conduct particular simulations, and so on, to determine whether an alternative path should be implemented or assigned for communications between the identified end-nodes.

Figure 6:
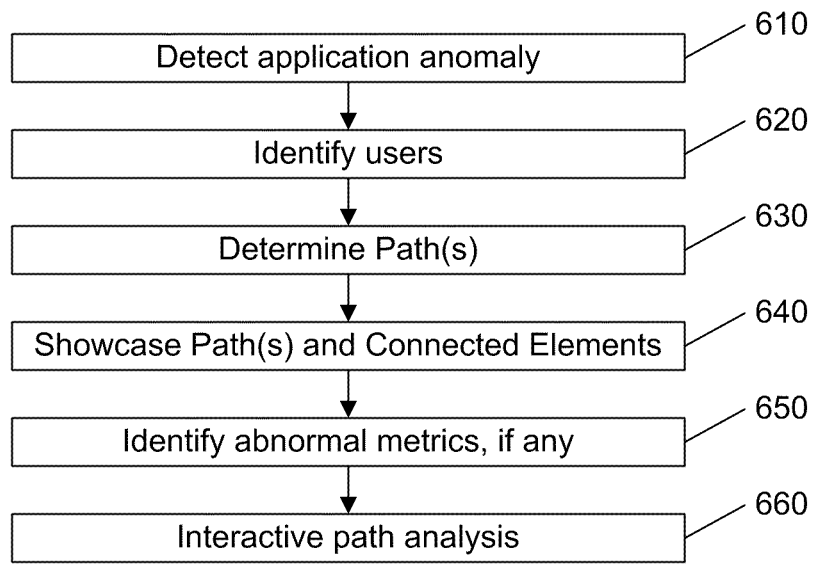
FIG. 6 illustrates an example flow diagram of the use of the monitoring system for planning purposes.

FIG. 6 illustrates an example flow diagram for an analysis conducted to isolate and diagnose anomalous performance of communications associated with an application.

At 610, an application anomaly is detected, for example by an auditing system that monitors performance of an application that accesses a particular server. At 620, the users that are affected by the detected anomaly are identified. That is, in the example of a particular server, the server is one of each pair of end-nodes, and the nodes that are being affected by the anomaly are each the other end-node of the pair.

At 630, the paths being affected by the anomaly are determined, based on the identification of the pairs of end-nodes being affected. Because the recognition of a 'pattern' is typically more easily detected by a human, the system is configured to showcase (for example, by graphically presenting and highlighting) the affected paths, at 640.

The system may also facilitate the diagnostic process by presenting and/or highlighting any anomalous metrics, at 650. That is, for example, if a particular link along the path exceeds particular delay duration, that link may be distinguished from among the other links along the path, using color, format, or other visual cue. Thereafter, at 660, the system allows the user to interact with the presented material to obtain more detailed information, select alternative paths, and so on.

Figure 7:
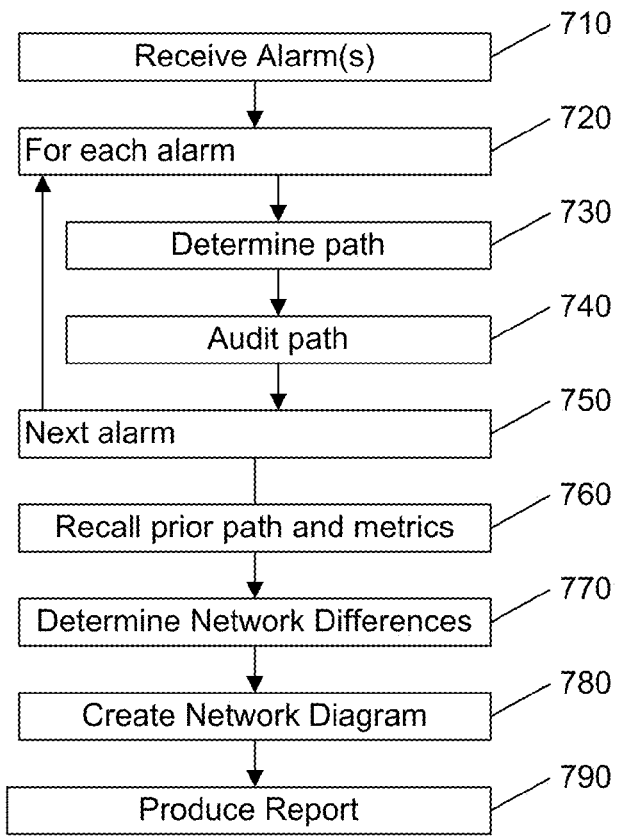
FIG. 7 illustrates an example flow diagram of the use of the monitoring system to respond to alarms.

FIG. 7 illustrates an example flow diagram for an analysis that may occur upon receipt of an alarm, such as a notification by a client that an application has been exhibiting a degradation in performance. Often, a change in network performance occurs when a change is introduced, either purposely or as a result of a non-purposeful event, such as a failure of a device. When a network change is introduced, the effects of the change will often affect multiple paths. For example, a failure of a device will generally cause each of the paths that had used the device to be automatically rerouted to alternative paths. Given that the original, non-fault, paths were likely the optimal paths for each user of the server, the change will likely result in a degradation in performance for all of the end-nodes that had used the failed device in their routing.

The loop 720-750 processes each of the received alarms. At 730, the path for each alarm (each reported affected user) is determined, and metrics associated with this path are collected, at 740. At 760, one or more prior sets of paths and their associated metrics are recalled from a storage medium, and at 770, the differences between the current paths and the prior paths are identified, as well as the differences between their corresponding metrics.

At 780, one or more network diagrams are presented to the user, based on the current and prior paths. Of particular note, because the prior path(s) are included in the presentation, devices that are not currently on any current path but had been on the prior path (e.g. failed devices) are included in the presentation, thereby facilitating a diagnostic of the 'cause' of the alarm(s). Preferably, such potential causes are visually distinguished in the presentation of the network diagram.

At 790, one or more reports are produced based on a comparison of the current and prior paths. As in the example analyses of FIGS. 5 and 6, the user is also provided the opportunity to interact with the presented network diagram and other performance reports related to the network diagram, to develop further details and/or to assess alternatives.

Figure 8:
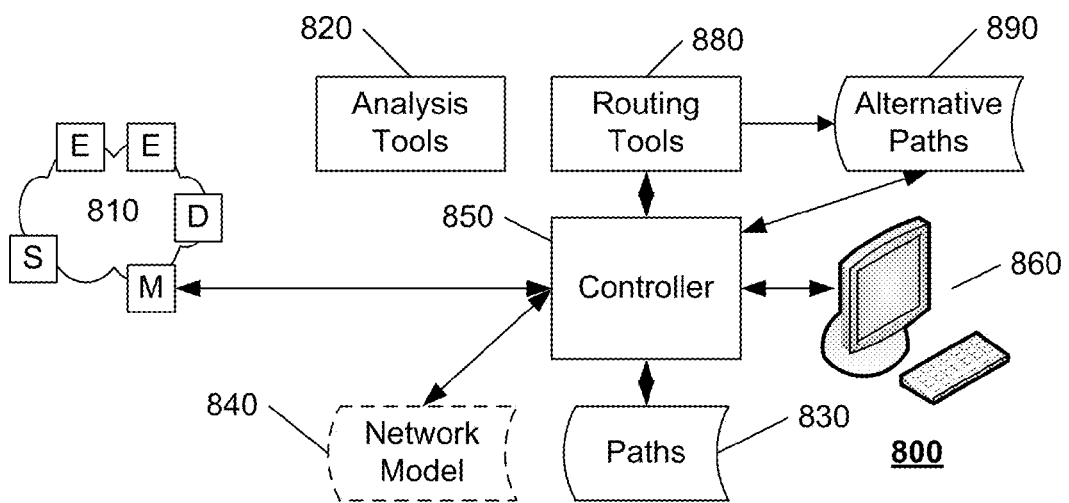
FIG. 8 illustrates an example block diagram of a monitoring system.

FIG. 8 illustrates an example block diagram of a network analysis system 800 for determining performance parameters with regard to a source node S and a destination node D on a network 810. These nodes S, D communicate via a communications path that includes one or more intermediate elements E. These elements E may include routers that dynamically determine the path between the source S and destination D using, for example, routing tables that indicate a next hop (next element E) associated with an address corresponding to destination D. The address corresponding to destination D may be the actual IP address of destination D, a translation of the IP address of destination D, a virtual IP address of destination D, and so on.

A controller 850 of the network analysis system 800 communicates with a monitor M that is also on the network 810, so as to be able to communicate with at least some of the elements E. The controller 850 also communicates with performance tools 820 and routing tools 880. The controller 850 interacts with a user of the system 800 via a user interface 860. Although the components of this system are illustrated as individual blocks, for ease of understanding, one of skill in the art will recognize that the functional partitioning may be changed, depending upon the particular embodiment of this invention. For example, the monitor M is shown separate from the controller 850 and other components in the system 800, although in many embodiments the monitor M and the controller 850 may be one integrated component in the system 800. In an alternative embodiment, the monitor M may, in fact, be multiple monitors that are distributed about the network 810. In such an embodiment, some of the below described monitoring functions may be performed by the controller 850, leaving the monitors to perform a limited set of these monitoring functions.

In a typical scenario, the user will request, via the interface 860, network performance information regarding the source S and destination D. Alternatively, the controller 850 may receive an automated request, based, for example, on a performance parameter exceeding a given threshold. In response, the controller will attempt to determine the path between source S and destination D, at least with respect to the network layer (layer-3) path, and perhaps additional detail, such as the data link layer (layer-2) devices that embody some or all segments of the network layer path.

As detailed above, depending upon the degree of control that the monitor has over the source S, the elements E, and the destination D, this path determination may include a mix of various path determining techniques, including, for example, determining portions of the path between the source and destination nodes using trace requests, determining other portions of the path based on configuration information associated with one or more elements along the path, and combining these determined portions of the path. This process may be repeated, along with determining other portions of the path by other means, as detailed above, until a network layer path between the source S and destination D is determined. The controller 850 may also direct the monitor M to attempt to collect other information, such as identification of data link layer devices that form the determined portions of the path.

If a network model 840 is available, the controller 850 may access the model 840 to determine the aforementioned configuration data, or, depending upon the level of detail in the model, to identify the data link layer devices that form the determined portions of the path.

The controller 850 may store the determined current path 830, to facilitate subsequent analyses, to facilitate subsequent path determinations, and to facilitate comparisons of paths over time. For example, if a subsequent problem is reported for the same pair of source-destination nodes, the controller 850 may access the prior path, then direct the monitor to report any differences in the configuration of devices along this prior path. If a routing table of one of the devices along this prior path has changed with regard to this source-destination pair, resulting in a diversion from the prior path, the path determination process need only start at this changed device, and need not re-determine the path from the source to this changed device. Additionally, as detailed above, determining where a path has changed may indicate a problem caused by a device that is no longer along the current path.

As also noted above, the controller 850 also directs the monitor 820 to collect performance metrics relative to one or more of the devices along the determined path. This performance metrics may include, for example, response time associated with identified hops along the path, interface utilization, interface errors, device CPU utilization, SLA data, and so on. The controller 850 may also access any of a variety of analysis tools 820 to perform, for example, statistical analysis, threshold comparisons, anomaly identification, and so on.

The controller 850 may also access routing tools 880, such as network simulators, protocol emulators, and so on, to derive alternative paths 890, as detailed above. Optionally, the user may define alternative paths 890. The controller may use one or more of the analysis tools 820 to compare the expected performance of the current path and these alternative paths, particularly if the system includes a network simulator that can be configured to provide expected performance metrics.

The controller 850 provides the results of the analysis of the performance metrics, as well as the metrics, to the user via the user interface 860. The controller 850 may also be configured to communicate alerts and warnings to remote systems.

The foregoing merely illustrates the principles of the invention. It will thus be appreciated that those skilled in the art will be able to devise various arrangements which, although not explicitly described or shown herein, embody the principles of the invention and are thus within its spirit and scope. For example, FIG. 2 illustrates a flow in which the trace request is used initially, and the configuration data is used when the trace request is unable to identify the complete path between the source and destination nodes. One of skill in the art will recognize that the order and/or priority of applying the different path determining techniques are immaterial to the principles of this invention. For example, with reference to FIG. 1, if communications from either the source node S or the element E1 are controllable by the monitor M, the monitor M may access the configuration of element E1 to determine the next hop (E2) toward the destination, and then attempt to initiate a trace request from element E2. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may include a processor, and software portions may be stored on a non-transient computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

We claim:

1. A non-transitory computer readable medium that includes instructions for causing a processor at a monitoring system to:
   receive a request for network performance information with regard to a source node and a destination node of a network,
   determine a current path on the network between the source and destination nodes using a trace request,
   determine a node in the network that is not on the current path, but that affects performance of at least one intermediate node on the current path, wherein the at least one intermediate node is other than the source and the destination nodes,
   collect performance data associated with the node that is not on the current path,
   process the performance data to provide the performance information, and
   provide a display of the performance information.

2. The medium of claim 1, including accessing configuration information of the intermediate node to obtain routing information associated with the intermediate node, wherein the routing information includes an identification of a next element from the intermediate node along the current path between the source and destination nodes.

3. The medium of claim 2, wherein the configuration information includes an identification of one or more data link layer devices along the determined current path.

4. The medium of claim 2, wherein the configuration information includes one or more routing tables at the intermediate node.

5. The medium of claim 4, wherein the instructions cause the processor to access the one or more routing tables by causing the program to communicate a command to a router to identify a next hop associated with the destination node.

6. The medium of claim 5, wherein accessing the one or more routing tables includes communicating an other command to an other router to communicate the routing table at the other router.

7. The medium of claim 4, wherein accessing the one or more routing tables includes communicating a command to a router to communicate the routing table at the router.

8. The medium of claim 2, wherein the configuration information includes one or more routing tables within a model of the network.

9. The medium of claim 8, wherein the model corresponds to a simulation model.

10. The medium of claim 1, wherein the request includes a problem report regarding communications between the source and destination nodes.

11. The medium of claim 1, wherein the request includes access information associated with the source node; and determining at least one of a first and second portions on the current path includes gaining access to the source node based on the access information.

12. The medium of claim 11, wherein the instructions cause the processor to determine the at least one of the first portions by causing the processor to transmit a trace request from the source node to the destination node.

13. The medium of claim 11, wherein the instructions cause the processor to determine the at least one of the first portions by causing the processor to transmit a trace request from the monitoring system to the source node.

14. The medium of claim 13, wherein the instructions cause the processor to determine the at least one of the first portions by causing the processor to:
   receive an identification of nodes between the monitoring system and the source node,
   gain access to a select node of the nodes between the monitoring system and the source, and
   transmit a trace request from the select node to the destination node.

15. The medium of claim 1, wherein the instructions cause the processor to
   compare the determined current path to a prior path between the source and destination nodes,
   identify at least one other node based on a difference between the current path and the prior path,
   collect other performance data for the at least one other node, and
   display other information based on the other performance data.

16. The medium of claim 15, wherein the instructions cause the processor to display a network diagram based on the difference.

17. The medium of claim 1, wherein the request is based on a performance threshold associated with communications between the source and destination nodes.

18. The medium of claim 1, wherein the instructions cause the processor to identify abnormal performance based on the performance data.

19. The medium of claim 18, wherein the instructions cause the processor to display a network diagram based on the abnormal performance.

20. The medium of claim 1, including determining one or more third portions of the current path by communicating tracing traffic from a node on one of first or second portions of the current path to the destination node, and noting the occurrence of this tracing traffic at one or more collection nodes.

21. A method comprising:
   receiving, at a monitoring system, a request for network performance information with regard to a source node and a destination node of a network,
   determining, by the monitoring system, a current path on the network between the source and destination nodes using a trace request, determining a node in the network that is not on the current path, but that affects performance of at least one intermediate node on the current path, wherein the at least one intermediate node is other than the source and the destination nodes, collecting, by the monitoring system, performance data associated with the node that is not on the current path, process the performance data to provide the performance information, and presenting the performance information to a user.

22. The method of claim 21, further comprising: accessing configuration information of the intermediate node to obtain routing information associated with the intermediate node, wherein the routing information includes an identification of a next element along the current path between the source and destination nodes.

23. The method of claim 22, wherein accessing the configuration information includes accessing one or more routing tables at the intermediate node.

24. The method of claim 23, wherein accessing the one or more routing tables includes communicating a command to a router to identify a next hop associated with the destination node.

25. The method of claim 23, wherein accessing the one or more routing tables includes communicating a command to a router to communicate the routing table at the router.

26. The method of claim 22, wherein the configuration information includes one or more routing tables within a model of the network.

27. The method of claim 22, including determining one or more third portions of the current path by communicating tracing traffic from a node on one of first or second portions of the current path to the destination node, and noting the occurrence of this tracing traffic at one or more collection nodes.

28. The method of claim 21, wherein the request includes access information associated with the source node; and determining at least one of first and second portions on the current path includes gaining access to the source node based on the access information.

29. The method of claim 28, wherein determining at least one of the first portions on the current path includes transmitting, by the monitoring system, a trace request from the source node to the destination node.

30. The method of claim 29, wherein determining at least one of the first portions includes:
transmitting a trace request from the monitoring system to the source node,
receiving an identification of nodes between the monitoring system and the source node,
gaining access to a select node of the nodes between the monitoring system and the source, and
transmitting, by the monitoring system, a trace request from the select node to the destination node.

31. The method of claim 21, including:
comparing the determined current path to a prior path between the source and destination nodes,
identifying at least one other node based on a difference between the current path and the prior path,
collecting other performance data for the at least one other node, and displaying other information to the user based on the performance data.

32. A monitoring system that includes:
a controller that is configured to:
receive a request for network performance information with regard to a source node and a destination node of a network,
determine a current path on the network between the source and destination nodes using a trace request,
determine a node in the network that is not on the current path, but that affects performance of at least one intermediate node on the current path, wherein the at least one intermediate node is other than the source and the destination nodes,
collect performance data associated with the node that is not on the current path,
process the performance data to provide the performance information,
a memory that is configured to store the determined current path, and
a display that is configure to present the performance information to a user.

33. The system of claim 32, wherein the request includes access information associated with the source node; and determining at least one of first and second portions on the current path includes gaining access to the source node based on the access information.

34. The system of claim 33, wherein the controller determines the at least one of the first portions by transmitting a trace request from the monitoring system to the source node.

35. The system of claim 34, wherein the controller determines the at least one of the first portions by:
receiving an identification of nodes between the monitoring system and the source node,
gaining access to a select node of the nodes between the monitoring system and the source, and
transmitting a trace request from the select node to the destination node.

36. The system of claim 33, including determining one or more third portions of the current path by communicating tracing traffic from a node on one of the first or second portions of the current path to the destination node, and noting the occurrence of this tracing traffic at one or more collection nodes.

37. The system of claim 32, wherein:
the controller:
compares the determined current path to a prior path between the source and destination nodes,
identifies at least one other node based on a difference between the current path and the prior path, and
collects other performance data for the at least one other node; and
the display presents other information based on the other performance data.

38. The system of claim 32, including accessing configuration information of the intermediate node to obtain routing information associated with the intermediate node, wherein the configuration information includes one or more routing tables within a model of the network.

* * * * *